No. 876,613.  
PATENTED JAN. 14, 1908.
J. WILKINSON.  
SHAFT PACKING.  
APPLICATION FILED MAY 7, 1906.
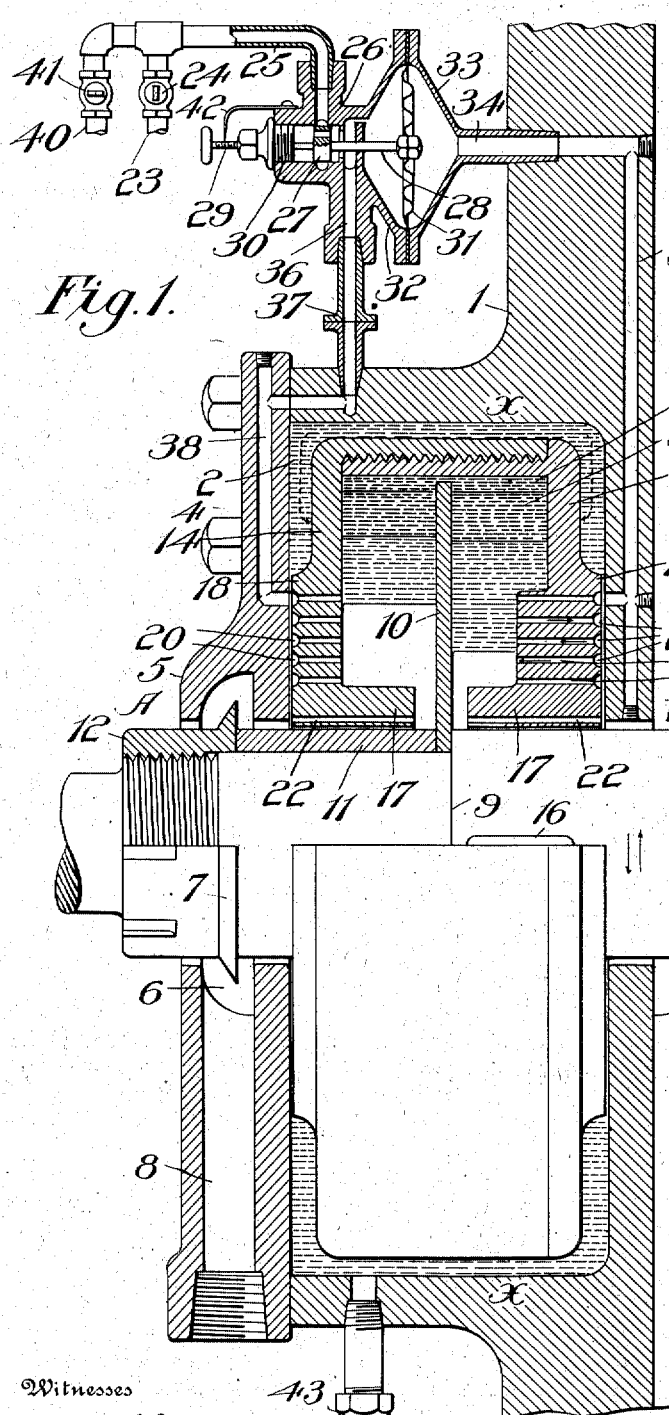
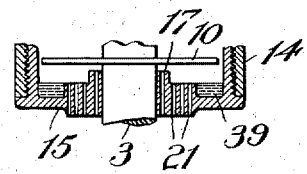
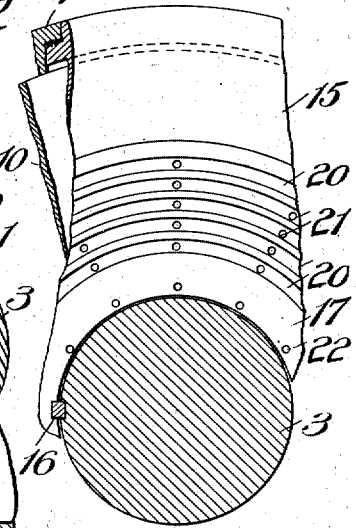
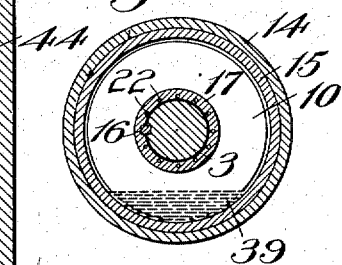
Witnesses  
Edwin L. Bradford  
P. H. Burch
Inventor  
James Wilkinson  
By  
Attorney

UNITED STATES PATENT OFFICE.

JAMES WILKINSON, OF PROVIDENCE, RHODE ISLAND, ASSIGNOR TO WILKINSON TURBINE COMPANY, OF BIRMINGHAM, ALABAMA, A CORPORATION OF ALABAMA.

SHAFT-PACKING.

No. 876,613.   Specification of Letters Patent.   Patented Jan. 14, 1908.

Application filed May 7, 1906. Serial No. 315,667.

*To all whom it may concern:*

Be it known that I, JAMES WILKINSON, a citizen of the United States, residing at Providence, in the county of Providence and State of Rhode Island, have invented new and useful Improvements in Shaft-Packing, of which the following is a specification.

My invention relates to a liquid seal packing for revoluble shafts of turbines and rotary motors.

The object of my invention is to produce a liquid seal packing, without positive metal contacts, which is applicable to vertical or horizontal shafts which are reversible as to rotation, will pack against pressure either way with equal effectiveness, will produce no end thrust on the shaft, will waste no liquid and will automatically maintain itself properly primed.

In its preferred form my invention comprises a rotatable liquid seal ring mounted with a slip fit on a shaft and chambered to receive a disk fixed on the shaft. The ring rotates in a packing chamber, normally filled with liquid, and coöperates with said liquid in a novel manner, hereinafter more particularly described, to maintain itself practically in equilibrium and to effectively seal the joints in the packing against leakage.

A further object is to provide the packing with an automatic priming apparatus to maintain it properly supplied with sealing liquid.

A further object is to adapt the packing to act with both mercury and water as the sealing medium, the mercury serving the important function of draining the chambered ring of water when the packing is out of operation.

My invention also comprises the details of construction and arrangement of parts which are illustrated in the accompanying drawings, wherein:—

Figure 1, is a vertical sectional view through the packing chamber in the head of a horizontal turbine, the packing ring being shown partly in section. Fig. 2, is an end view of a portion of the water seal ring mounted on the shaft and indicating the grooves and local circulation ports. Fig. 3, is a sectional view along the line $x$—$x$, Fig. 1, reduced in size and illustrating the body of mercury in the ring when at rest. Fig. 4, is a view corresponding to Fig. 3, showing my invention applied to a vertical shaft.

Similar reference numerals refer to similar parts throughout the drawings.

As illustrated in Fig. 1, my improved packing or stuffing-box is shown applied to a horizontal turbine, the exhaust head 1 of which is provided with an annular chamber 2 surrounding the revoluble shaft 3, which passes centrally therethrough. A two part cap or closure 4 is bolted to the head and forms the outer end closure for the packing chamber, being flanged at 5 to form a separate annular chamber 6 for a centrifugal slinger 7 which catches the leakage so that it flows off through a drip passage 8. The shaft is reduced opposite the center of the chamber 2 to form a shoulder 9, against which an annular disk 10 is pressed, by means of a sleeve 11 and nut 12, so as to form a tight joint therewith and rotate with the shaft, the nut being in threaded engagement with a reduced threaded portion of the shaft. The sleeve 11 is preferably of the same external diameter as the shoulder 9. Within the chamber 2 is a liquid seal ring formed in two halves 14 and 15 which are of similar design, except that the axially disposed flange of the section 15 is reduced and threaded so as to screw into a similarly disposed internally threaded flange of the section 14. This liquid seal ring fits the shaft and sleeve loosely, the section 15 being slidably connected to the shaft by an axial spline or key 16 which causes the ring to rotate with the shaft but leaves it free to slip axially thereon. The inner shaft engaging portions or hubs 17 of the ring extend inwardly towards the disk 10, leaving, however, ample axial clearance on each side of said disk to prevent contact between it and the ring. A small radial clearance is left between the outer periphery of the disk and the inner wall of the ring chamber, the interior of which is thus divided into two annular chambers which communicate around the periphery of said disk.

The liquid seal ring is provided with two oppositely disposed annular clearance faces 18 and 19 in the side faces of the sections 14 and 15, respectively. These lateral faces start at the shaft and extend partway towards the periphery of the ring which is reduced above them to provide a circulation passage between the ring and the packing chamber. The faces 18 and 19 stand normally in close proximity to the adjacent side walls of the packing chamber which are faced off parallel with said faces. Both of the ring faces are adapted to co-act with the chamber walls to pack in the manner hereinafter described by a liquid sealed joint as contrasted with a friction or rubbing contact. The ring clearance on each side may be adjusted, through the screw connections between the ring sections, so as to bring the faces 18 and 19 almost into contact with the chamber walls. These faces are also provided with a plurality of concentric grooves 20 from each of which a number of ports 21 lead in an axial direction through the face into the ring chamber. A plurality of ports 22 are also disposed in the hub section 17 of each ring next to the shaft. The purpose of these ports 21 and 22 is to provide for a circulation through the ring faces to perfect the liquid seal joint and also to prevent a difference of pressure existing between the inside and outside of either ring face to unduly unbalance it.

The apparatus as thus described must be flushed with water or other sealing liquid and maintained primed since the liquid must be depended upon to seal the joint between the disk 10 and the ring, and to lubricate and seal the joint between the face 18 or 19 and the chamber 3. To this end I provide a supply pipe 23 leading from a suitable source of liquid, as water, under the required pressure. This pipe is provided with a valve 24 and coupled to a pipe 25 which enters the casing 26 for the automatic priming valve 27. This valve may be of any desired construction, that shown consisting of a hollow piston valve connected on one side to an operating stem 28 and on the other side to a graduated stem 29 which projects out of the casing through a gland 30. The stem 28 for the valve is connected to a fluid pressure controlled flexible diaphragm 31 which is clamped between two dish-shaped sections 32 and 33, thus forming a divided controller chamber. The section 32 is formed as a part of the valve casing 26 and the section 33 is provided with a tubular nipple 34 which is inserted into the outer end of a passage 35 formed in the head 1 and leading at right angles therethrough into the chamber 2 opposite the outer periphery of the face 19. A port 36 leads through the valve casing and, by means of a coupling 37, communicates with a passage 38 which leads through the head and cap 4 and opens into the chamber 2 opposite the outer periphery of the face 18. It will thus be seen that the diaphragm 31 in the valve controlling chamber is exposed on opposite sides to the pressures existing at different points in the stuffing-box or preferably at the clearance faces of the ring. In some cases a spring or other force may be used to counteract the pressure from the sealing liquid exerted to operate the valve.

Before admitting water to the packing, I prefer to introduce a body of mercury 39 into the disk chamber in the ring, as shown in Fig. 3, this body being sufficient, when in rotation, to seal the radial clearance between the disk and ring. Upon opening the valves 24 and 27, a supply of water will flow into the chamber 2 and through the ports 21 and 22 and will enter the disk chamber in the ring. As the ring and disk commence to rotate with the shaft and different pressures exist on each side of the packing, the mercury and water in the disk chamber will be subjected to two opposing influences, the centrifugal effect of its rapid rotation which tends to force them towards the periphery of the ring chamber, and the differences in pressure existing on opposite sides of the disk which tend to force the liquids around the disk and ring into or out of the turbine.

Assuming that the disk is operating between the atmospheric pressure A of approximately fifteen pounds and a vacuum V which may be regarded as zero, the pressure A will tend to force and the vacuum V to draw the liquid sealing medium around the disk and into the right hand ring chamber until a sufficient excess quantity thereof exists in said chamber to counterbalance, by its centrifugal action, the action of said pressures and prevent further axial circulation around the periphery of the disk. This annular body of mercury and water, under centrifugal pressure, will therefore effectively resist leakage around the disk in the ring chamber, sealing the joint and compelling any leakage to take effect past the faces 18 and 19 around the ring. This excess body of mercury and water performs another important function, i. e. to balance the disk 10 and thereby avoid end thrust on the shaft. To further increase the effectiveness of this joint and also the balancing thrust of the liquids, I may introduce an extra body of mercury $39^e$ into the ring chamber by means of a pipe 40, supplied with mercury under the required pressure and coupled to pipe 25, a valve 41 being provided in the pipe 40. Thus as seen in Fig. 1, the excess bodies of water and mercury in the right hand disk chamber are indicated. The centrifugal effect on these bodies produces a thrust to the left on the disk which substantially equals or balances the effect of the high pressure A against the exposed portion of the disk. By thus balancing the disk it will also be seen that the ring is internally balanced. The ports 21 and 22 prevent a difference of pressure existing between the inside and outside of either face 18 or 19 of the ring. As pressure A or V varies, a shifting of the liquid sealing medium will be necessary to meet the change in pressure conditions. The mercury, being of much greater density than the water, will prevent the shifting of the water around the disk, though the body of mercury will adjust itself as the changes in pressure occur. The water, therefore, in passing from one to the other of the disk chambers in the ring, must flow around the ring through the circumferential passage formed between the ring, above the clearance faces, and the walls of the chamber. In the construction shown, the joint between the ring and chamber will be effectively sealed at the face 19, the pressure of the liquid surrounding the ring being substantially that of A. The tendency of the pressure to force or the vacuum to draw the water in this outside passage into the turbine is prevented by the local action which takes place at the face 19. As the water tends to flow through the clearance between the face 19 and the chamber, due to the draft of the vacuum, it will be deflected, as it enters the successive grooves 20, through the ports 21 into the ring chamber, as this offers the path of least resistance. Thus, assuming that the pressure of the water at the outermost groove in the face 19 is at fifteen pounds, or atmospheric pressure, that in the next inner groove will be reduced approximately fifty per cent., that in the next inner groove will be reduced almost to the vacuum, and that in the other grooves will be at vacuum. The small arrows in the ports 21, as seen in Fig. 1, indicate the local circulation or action caused by centrifugal action of water drawn into the ring. This local action of the water acts in conjunction with the closely opposed faces of the ring and chamber to effectively seal the joint between them, thereby preventing the leakage between the pressures A and V and waste of the water. Were V the higher pressure this same action would take place at the face 18.

The importance of maintaining the packing primed with water and of rapidly restoring the water in case it is blown out, is obvious. This is provided for in my construction by the automatic action of the valve 27. When the packing is primed and in operation, as shown in Fig. 1, the diaphragm 31 stands at its normal position in which the valve is closed. If the quantity of liquid in the packing becomes reduced too much for effective action, it will be readily seen that the vacuum will take effect between the face 19 and chamber 2 to gradually lower the pressure in the outer groove 20 opposite which the passage 35 opens. This causes a lowering of the pressure in the passage 35 and in the right hand side of the diaphragm chamber. The pressure A which acts against the left hand side of the diaphragm will force it to the right and move valve 27 to open and supply water to the packing chamber. Should the liquid be blown from the packing, the vacuum will take instantaneous effect in the diaphragm chamber and the valve will be thrown open immediately to recharge the packing.

A needle 42 points to the graduated valve stem 29 so as to indicate the position of the valve. By means of this stem the valve 27 may be opened by hand when necessary.

Water and excess mercury may be drained from the chamber 2 through a cock 43, and excess water from the clearance around the ring is drained off through a passage 44 to a trap or the condenser. Any water tending to leak outwardly along the sleeve is caught by the centrifugal slinger 7 in the chamber 6 and drained off through the passage 8.

The body of mercury in the ring, as shown in Fig. 3, should be maintained sufficient in quantity to cause all of the water to drain out of the packing ring through the ports 21 when the turbine is not in operation. This is of considerable advantage, as otherwise the packing would have to be opened and the water drawn off to prevent its freezing. This same function is obtained by the mercury in Fig. 4, where I have illustrated my invention as applied to a vertical turbine, it being evident that the parts will act as effectively in vertical as in horizontal machines.

The packing as thus described is reversible as to rotation of shaft, will pack in a vertical or horizontal position and in either direction against a difference in pressure, will cause no end thrust on the shaft, has no injurious metal contacts and is fully lubricated at all points. It will further be noticed that where the body of mercury is used it is maintained cool by a water jacket around the ring which is important since mercury boils at a low temperature and might disturb the seal around the disk. There is comparatively little loss of liquid in the operation of this packing and the valve acts automatically to supply liquid when and in the quantity needed.

In certain designs I may dispense with the use of mercury and use water only, and I may make the groove 20 in the form of a single spiral of numerous turns instead of a plurality of concentric grooves. In which case the liquid would circulate over the disk 10 instead of locally as at face 19.

What I claim as new and desire to secure by Letters Patent, is:—

1. In a revoluble shaft packing, the combination with a revoluble shaft, of a stationary closure surrounding the shaft, a revoluble element mounted with a slip fit on said shaft and disposed in said closure, an annular chamber in said element, a disk fixed on said shaft and disposed in said annular chamber, and a liquid sealing medium to pack the joints between said element and the disk and closure.

2. In a revoluble shaft packing, the combination with a stationary packing chamber, of a revoluble shaft which passes therethrough, a ring mounted with a slip fit on said shaft and revoluble therewith in said chamber, said ring having one or more working faces which co-act with the walls of said chamber, an annular chamber in said ring, sealing liquid in and around said ring, and a rotatable disk which coöperates with said liquid to substantially axially balance itself and the ring.

3. In a revoluble shaft packing, the combination with a stationary casing supplied with liquid, of a revoluble casing also supplied with liquid, a revoluble shaft surrounded by said casings which are disposed one within the other, and a disk fixed with a pressure tight joint to said shaft and partly submerged in the liquid in said revoluble casing.

4. The combination with an internally chambered ring, of a revoluble shaft on which said ring is mounted with a slip fit, a closure which receives said ring, working faces on the ring adapted to co-act with the opposite side walls of said closure, a liquid surrounding said ring and adapted to seal the clearance between said faces and closure, and means to substantially axially balance the said ring.

5. In a revoluble shaft packing, the combination with a shaft, of an annularly chambered ring mounted with a slip fit on said shaft and revoluble therewith, a circumferential slot in the inner wall of the ring, a revoluble disk mounted pressure tight on the shaft and adapted to enter the ring chamber through said slot, ample axial clearance being left between the ring and disk, a stationary casing in which said ring rotates with close axial clearances, and a liquid sealing medium in said casing and ring which coöperates with said parts, as and for the purposes described.

6. A revoluble shaft packing comprising a shaft, a stationary chamber casing, a liquid seal ring in said casing, an inwardly opening annular groove in said ring, an annular projection on the shaft which enters said groove, a liquid in and around said ring, and one or more close axial clearances between the ring and casing which is or are sealed by said liquid.

7. A stuffing-box comprising a fixed closure containing liquid, and two rotatable parts combined with a rotating body of liquid which, by its centrifugal force, seals the joint between said parts, said parts being capable of independent axial adjustment and the liquid in said closure acting to seal the clearance between the fixed and rotating parts.

8. A stuffing box comprising a closure containing liquid, a liquid seal ring in said chamber, packing faces on the ring and closure, one of which faces is fixed and the other of which rotates with close lateral clearances relatively to said fixed face, and a plurality of local circulation passages for the sealing liquid in one of said faces, said liquid intervening between said faces and sealing the joint between them.

9. A packing for a rotating shaft comprising a closure containing liquid, and a ring, one of which rotates with said shaft, lateral co-acting faces, the joint between which is sealed by said liquid, and an annular reservoir connected by a plurality of ports with a curved groove in one of said co-acting faces, said faces being free of axial adjustment with said shaft.

10. In a liquid packing, the combination with a revoluble shaft and a packing chamber therefor, of a revoluble chambered ring disposed in said packing chamber and having a lateral face which co-acts with a wall of said chamber, liquid in said chamber to seal the joint between said face and wall, and pressure equalizing ports leading through said face into the interior of the ring.

11. In a packing, a revoluble shaft, a casing surrounding said shaft, a revoluble chambered ring axially adjustable on said shaft and disposed in said casing, said ring having a lateral face which co-acts with a wall of said casing, a body of liquid in said casing which seals the joint between said face and wall, a plurality of concentric circular grooves in said face, and ports leading from each groove into the interior of said ring.

12. In a packing, a revoluble shaft, a casing surrounding said shaft, a revoluble chambered ring axially adjustable on said shaft and disposed in said casing, said ring having lateral contact faces which co-act with the opposite side walls of said casing, a body of liquid in said casing which surrounds said ring and acts to seal the joint between said face or faces in said casing, said faces being provided with curved grooves, ports leading from said grooves into the interior of the ring, and means disposed within the ring which co-act with the liquid therein and tends to balance said ring.

13. The combination with a revoluble shaft, and a liquid stuffing-box therefor comprising a closure, elements therein and a rotating body of liquid which intervenes and forms a joint between said elements, both of which rotate with said shaft, of an apparatus to automatically maintain said closure primed with liquid, which comprises a liquid supply passage, and a valve therefore which responds automatically to pressure conditions at two points in said stuffing-box.

14. A packing for a rotating shaft comprising a closure containing liquid and a liquid seal ring within said closure, lateral co-acting faces on said ring and closure, one of which faces rotates on said shaft and the joint between which and said other face is sealed by said liquid, in combination with a supply passage for said sealing liquid, and an automatic supply valve for said passage which moves responsive to pressure conditions between said faces.

15. A shaft packing comprising a casing provided with an annular chamber for receiving a liquid which surrounds said shaft, an element connected to said shaft and extending within said chamber and into the liquid therein, a liquid supply passage for said chamber, and an automatic supply valve therein sensitive to pressures on opposite sides of said element.

16. The combination with a liquid seal packing comprising a packing chamber containing liquid, a revoluble shaft which passes through said chamber, and a revoluble liquid seal ring mounted with a slip fit on said shaft and moving with close lateral clearances in said chamber, of an automatic priming apparatus comprising a valve sensitive to variations in pressure at said lateral sealing clearances and controlling a supply of liquid to said chamber.

17. A shaft packing comprising a casing provided with a chamber for receiving a body of liquid, a revoluble shaft, a liquid seal ring revoluble with said shaft and disposed in said chamber, lateral faces on the ring which move in close proximity to the side walls of said chamber and are provided with curved grooves, a free clearance between the periphery of the ring and casing, an annular chamber in the ring, ports leading thereinto from said grooves, a disk and body of liquid in said ring, passages leading from opposite the outer grooves of each face to a valve controller chamber, a liquid supply valve, and means in said controller chamber to operate said valve automatically responsive to pressure conditions at said ring faces and control the supply of liquid to said casing chamber.

18. The combination with a revoluble shaft, of a stuffing-box therefor comprising a chamber in a fixed casing, a body of liquid therein, a chambered ring which enters said liquid in said chamber and revolves with said shaft, an annular projection on said shaft which enters the chamber in said ring, and liquids of different specific gravities in said ring chamber which respond to centrifugal force and seal the joint between projection and ring, said liquids in and around said ring being adapted to flow from one side to the other of said ring and projection.

19. A stuffing-box for rotating shafts comprising a fixed chamber, a rotatable annularly chambered element therein containing mercury and a lighter liquid fluid, a disk which has its periphery submerged in both said bodies of liquid when said element is moving, and means to provide for an axial circulation of said lighter liquid around said element.

20. A stuffing-box for rotating shafts comprising a casing surrounding the shaft, a chamber therein supplied with liquid, an annularly chambered ring in said casing, lateral ports in the side walls of said ring, a body of mercury in said ring, and a disk which enters said chamber in the ring, said mercury being sufficient in quantity to seal the peripheral clearance between said ring and disk when in rotation and when quiescent to drain off said liquid from within the ring.

21. A stuffing-box for rotating shafts comprising a casing surrounding the shaft, a chamber therein supplied with liquid, an annularly chambered ring in said casing, lateral ports in the side walls of said ring, an annular groove in one of said ring walls into which one or more of said ports open, a body of mercury in said ring, a disk which enters said chamber in the ring, and a supply passage for the mercury and other liquid which opens through said casing and discharges directly into said groove.

22. In a liquid shaft packing, the combination with a revoluble shaft, of a closure containing liquid and a ring surrounding said shaft, one of said parts being revoluble therewith, lateral co-acting faces on said ring and closure, the joint between which is sealed by said liquid, and one or more curved grooves in one of said co-acting faces, said ring and closure being relatively adjustable in an axial direction independent of said shaft.

23. In a liquid packing, a rotating shaft, a stationary packing chamber, a recessed floating sealing ring therein, and a disk on said shaft which projects into the recess in said ring, substantially as described.

24. In a liquid packing for a rotating shaft, a packing chamber, a floating sealing ring therein, a revoluble disk, and a body of liquid acted upon by said disk and by the differences in pressures to which the packing is subjected to seal the clearances in said packing.

25. In a packing for rotating shafts, a chamber surrounding the shaft, a floating element therein, a revoluble disk mounted on the shaft, and a body of liquid acting to seal the clearances between said disk, ring and chamber, substantially as described.

In testimony whereof I have hereunto set my hand in presence of two subscribing witnesses.

JAMES WILKINSON.

Witnesses:
JAMES H. NOLAN,
CHARLES W. HOWARTH.